Nov. 2, 1971    S. A. WARREN    3,616,549
TACHISTOSCOPIC DEVICE
Filed Dec. 24, 1969    2 Sheets-Sheet 1
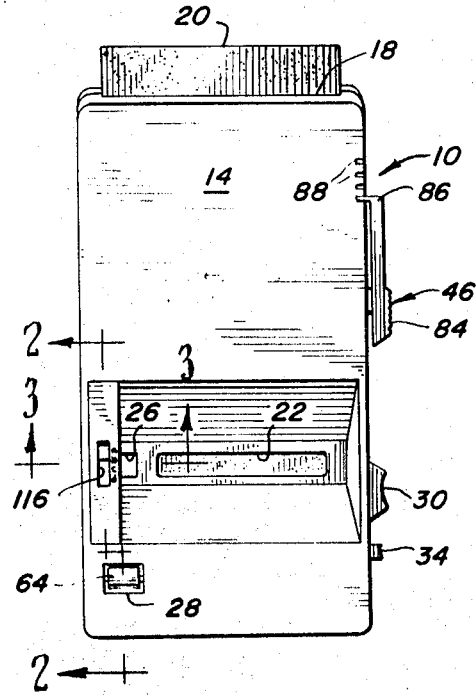
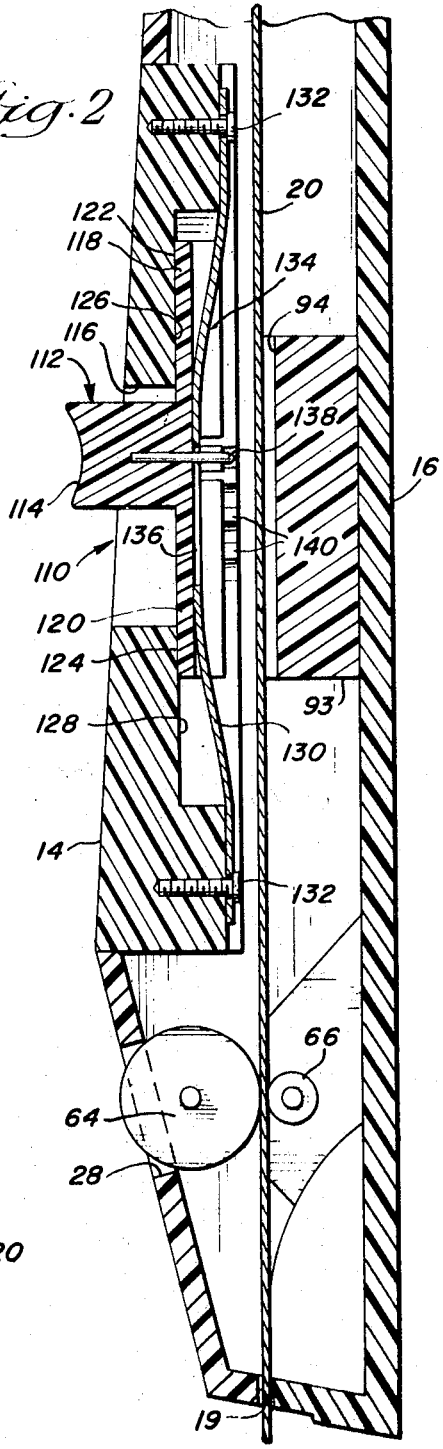
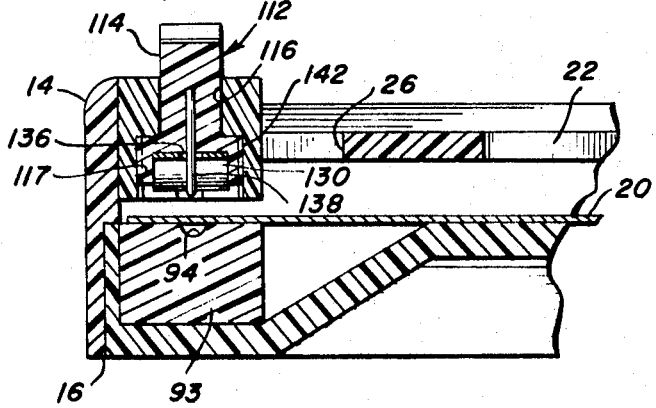
INVENTOR
Steven A. Warren
BY Dressler, Goldsmith, Clement & Gordon
ATTORNEYS Nov. 2, 1971  S. A. WARREN  3,616,549
TACHISTOSCOPIC DEVICE
Filed Dec. 24, 1969  2 Sheets-Sheet 2
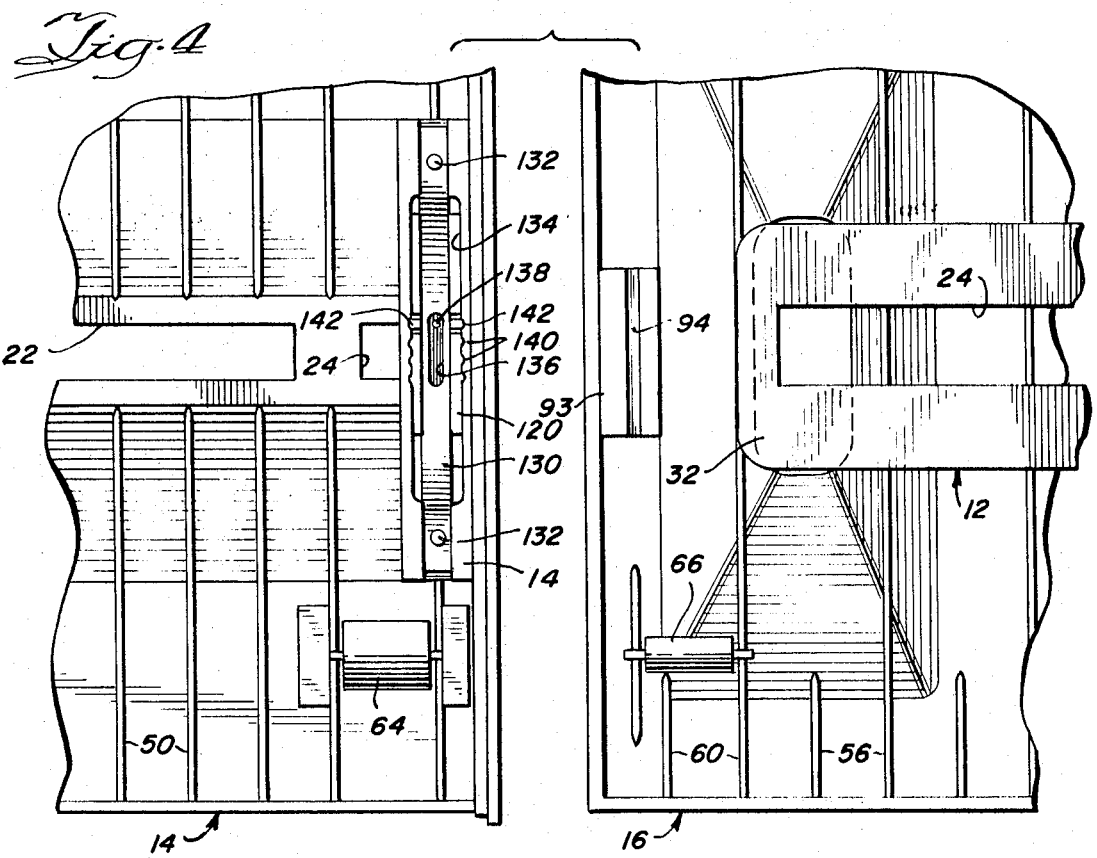
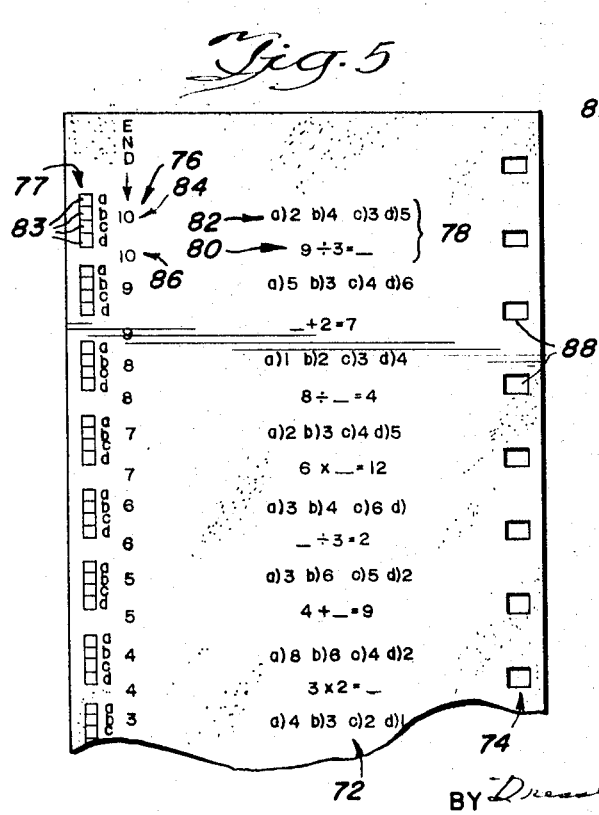
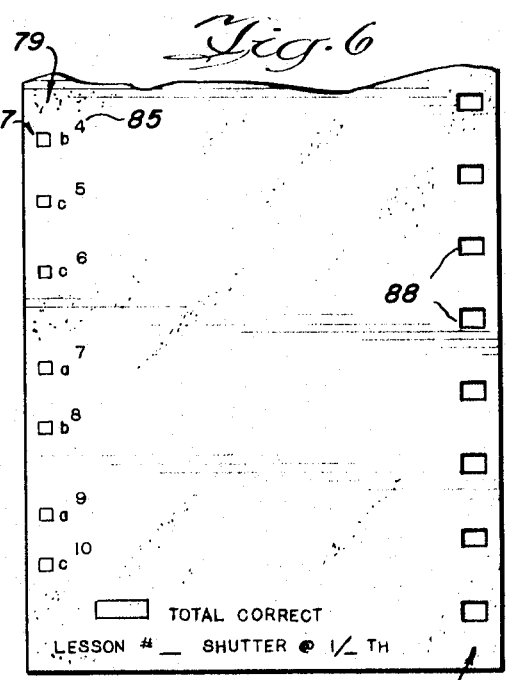
INVENTOR
Steven A. Warren
BY Dressler, Goldsmith, Clement & Gordon
ATTORNEYS

United States Patent Office 3,616,549
Patented Nov. 2, 1971

3,616,549
TACHISTOSCOPIC DEVICE
Steven A. Warren, 480 Saunders Road,
Lake Forest, Ill. 60045
Filed Dec. 24, 1969, Ser. No. 888,001
Int. Cl. G09b 3/06, 17/04
U.S. Cl. 35—9 R       4 Claims

ABSTRACT OF THE DISCLOSURE

A tachistoscopic device for use with a sheet of symbols to be recognized when momentarily exposed. The device includes a frame having a symbol viewing window, and a shutter is movable past the window to momentarily expose the symbol to be viewed. The sheet of symbols preferably includes a plurality of sets of symbols, each set including a symbol to be viewed, such as a question, and an evaluation symbol to be compared therewith, such as a multiple choice answer. The sheet also includes a marking zone for each question with each zone having a plurality of rectilinearly spaced areas, each area corresponding to one answer of said multiple choice answers. A manually operable rectilinearly movable marking device is mounted in the frame for marking a selected area of the sheet after the questions have been flashed and the multiple choice answers have been exposed.

BACKGROUND OF THE INVENTION

The tachistoscopic device of the present invention is an improvement upon the near-point tachistoscope disclosed in Warren et al. Pat. No. 3,358,391. The device of the above-mentioned patent provides a relatively simple means for momentarily exposing or "flashing" symbols for recognition by a person seeking to improve his reading skills by speeding up his rate of recognition of such symbols.

In my pending application Ser. No. 699,633, filed Jan. 22, 1968, an improved tachistoscopic device and flash recognition training system are disclosed wherein the user of the device can mark the sheet of symbols after he compares the symbols with a separate sheet of evaluation symbols. While this improved structure and system has proven to be highly desirable, it is somewhat troublesome to have to use two separate sheets to compare the symbols to be recognized with the evaluation symbols.

In my pending applications Ser. Nos. 803,581 and 809,191, filed Mar. 3, 1969, and Mar. 21, 1969, respectively, a still further improved tachistoscopic device is disclosed wherein a novel sheet feeding means cooperates with a single sheet having sets of both viewing and evaluation symbols thereon to facilitate marking of the sheet after a viewable symbol has been flashed and compared with an evaluation symbol.

SUMMARY OF THE INVENTION

In order to facilitate concentration and interest and improve the speed and ability of the tachistoscope user to compare the viewed symbol with an evaluation symbol, the present invention includes a single sheet having viewable symbols thereon in the form of questions and evaluation symbols thereon in the form of multiple choice answers. The sheet further includes a marking zone for each question, and each marking zone is divided into a plurality of rectilinearly spaced marking areas, one for each answer of each multiple choice answer. Marking means is provided on the tachistoscope, and the marking means includes a rectilinearly movable marking device that is manually operable for making an indication on the sheet in each of the marking zones of the sheet to record the answer that has been selected by the tachistoscope user.

BRIEF DESCRIPTION OF THE DRAWINGS

FIG. 1 is a top plan view of a tachistoscope formed in accordance with the present invention;

FIG. 2 is an enlarged sectional view taken along line 2—2 of FIG. 1;

FIG. 3 is an enlarged sectional view taken along line 3—3 of FIG. 1;

FIG. 4 is an enlarged fragmentary lay open plan view of the top and bottom parts of the tachistoscope; and FIGS. 5 and 6 are fragmentary plan views of the top and bottom, respectively, of the sheet of symbols usable with the tachistoscope.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The tachistoscope of the present invention is illustrated generally at 10 in FIG. 1, and includes an exposure control member in the form of a shutter 12 (FIG. 4) which is positioned within a chamber formed by a top container member 14 and a bottom container member 16. Mating members 14 and 16 define an entrance slot 18 at one end of the tachistoscope 10 and an exit slot 19 at the opposite end of the tachistoscope. To use the tachistoscope 10, a sheet of symbols 20 is inserted through slot 18, and pushed into operating position within the tachistoscope. An advancing mechanism is actuated to sequentially index the sheet 20 through the tachistoscope and out of slot 19.

Near its end opposite slot 18, top container member 14 is provided with a viewing window defined by a generally rectangular aperture 22, through which the user of the tachistoscope may view the symbols on sheet 20 when a portion of the sheet is exposed through slot 24 (FIG. 4) in exposure control member 12. Container member 14 is also provided with indexing aperture 26 adjacent viewing aperture 22, with an indexing symbol on sheet 20 being movable into alignment with aperture 26 when a symbol to be viewed is moved into alignment with aperture 22.

As is best seen in FIG. 4, exposure control member 12 consists of movable shield 32 having exposure slot 24 defined therein. Exposure control member 12 carries finger tab 30, which extends outside the chamber formed by mating container members 14 and 16 to an exposed position that permits the user of the device to move the exposure control member into the cocked position, as is described in detail in my above-mentioned copending applications.

Trigger means 34 extends outside the chamber formed by mating container members 14 and 16, and trigger means 34 includes a latch member having a first and second hook thereon for engaging and releasing, as desired, a complementary hook at the end of bolt means carried by exposure control member 12, as is also explained in detail in my above-mentioned copending applications. The first and second hooks cooperate, respectively, with the exposure control member to releasably retain it in a first or cocked position and a second or comparison position. Trigger means 34 is movable against the bias of a coil spring (not shown) for selectively releasing the above-mentioned hooks.

A tension spring (not shown) is connected at one end to exposure control member 12, and at the other end to a time control mechanism 46 which is employed to govern the time of exposure that is produced when exposure control member 12 is triggered from its cocked condition into its discharge position to cause momentary exposure of symbols on sheet 20 when exposure slot 24 passes through a poition of alignment with viewing aperture 22 in top container member 14. As is explained in the above-mentioned Warren patent, the time control mechanism 46 is included within the single chamber formed of the two mating container members 14 and 16, except for an exposed portion 84 that protudes out of the container for adjustment by the user of the tachistoscope. The time control mechanism is mounted for sliding movement relative to the tachistoscope frame and a protuberance 86 on the time control mechanism may be selectively positioned in any of a plurality of indentations 88 in the other side wall of top container member 14.

Corresponding parts of mating container members 14 and 16 will be aligned when these two members are assembled in the manner described. Parallel rib members 50 in top member 14 will lie above parallel rib members 56 in bottom member 16, with the plane of rib edges being spaced by a distanec slightly greater than the thickness of sheet of symbols 20, to provide a space for the movement of said sheet. The exposure control member 12 helps to confine the sheet of symbols 20 against the upper edges 60 of parallel rib members 56 of bottom mating member 16. The sheet of symbols 20 is also supported upon the upper surface of a back up member 93 between ribs 56 adjacent the left-hand side of exposure control member 12. Back up member 93 has an elongate groove 94 in the upper surface thereof, for a purpose to hereafter appear.

The front side of sheet of symbols 20 includes a generally centrally disposed column 72 of sets of symbols, a column 76 of indexing symbols adjacent the left-hand edge, and a column 77 of marking zones outwardly of column 76. A column 74 of means enabling the sheet to be indexed through the tachistoscope 10 is provided at the right-hand edge of the sheet, as viewed from the front side. A column 79 of checking or grading zones is provided on the rear side of sheet 20 in alignment with column 77. The column 72 includes a plurality of sets 78 of symbols, each set including a viewable symbol 80 to be recognized when exposed and an evalution symbol 82 to be compared with the viewable symbol. The symbols 80 and 82 preferably have different colors, so that the user of the tachistoscope can readily distinguish between them, and in an exemplary embodiment, the viewable symbols are black while the evalution symbols are red. In order to make the tachistoscope more enjoyable to use, and to increase the user's concentration, the viewable symbols 80 are in the form of quesitions and the evaluation symbols 82 are in the form of multiple choice answers. While mathematical questions are illustrated in the drawings, it should be understood that the invention is not limited thereto, and purely verbal questions could be used.

The column of indexing symbols includes a pair of identification symbols 84 and 86 for each set of symbols 78, which are movable into alignment with aperture 26 to indicate the index position of the sheet 20 to the user of the tachistoscope. The coumn 76 also preferably includes "start" and "stop" indicia at the lower and upper ends thereof, respectively, for advising the user of the tachistoscope of the position of the sheet 20 relative to the tachistoscope frame. The means enabling the sheet 20 to be indexed relative to the tachistoscope includes a plurality of spaced openings 88 that are adapted to be engaged by means associated with exposure control member 12. Column 79 includes a question identification symbol 85, and a correct answer symbol or symbols 87. In the illustrated embodiment each answer of the multiple choice answers is identified by a lower case letter designator, and the correct answer symbols preferably include a corresponding letter designator, as well as a box to be marked by a marking device to be hereafter described. Each zone in column 77 includes a plurality of rectilinearly arranged marking areas 83, each area corresponding to an answer of the multiple choice answers. As illustrated in FIG. 5, the marking areas 83 may include a marking box and a letter designator.

In order to index the sheet 20, exposure control member 12 is provided with abutment means in the form of a downward extending pin (not shown), and the pin is positioned in alignment with the row of openings 88 when the sheet 20 is positioned within the tachistoscope 10. As is explained in the above-mentioned copending applications, the indexing pin has an inclined surface so that the sheet can be moved past the pin without tearing when it is initially placed in the tachistoscope. When the "start" indicia of column 76 is visible through aperture 26, the pin is received within the first opening 88 and when the exposure control member 12 is moved downwardly into the cocked position, the pin engages against the edge of the opening to index the sheet 20 to a position wherein the viewable symbol 80 of the first set of symbols is aligned with the aperture 22, and the first indexing symbol 84 is aligned with aperture 26.

When the trigger 34 is pushed inwardly to disengage the first latching hook, the exposure control member is moved upwardly by the tensioning means at a rate determined by the setting of the time control mechanism 46. As the slot 24 in the exposure control member 12 moves past the viewable symbol 80, the question is momentarily exposed through aperture 22 for recognition by the tachistoscope user. After the symbol 80 has been exposed, the exposure control member 12 is pulled downwardly against the bias of the tensioning means to shift sheet 20 downwardly and to engage the second latching hook on the trigger. This locates the slot 24 in the exposure control member in a position exposing the multiple choice answer evaluation symbol 82 through the aperture 22, so that the answer to the question can be selected. During movement of the exposure control member 12 from the released position to the comparison position, the portion of the upper member 14 below aperture 22 covers the previously exposed symbol 80 while the portion of member 12 above aperture 24 covers the symbol 80 to be subsequently exposed. After the evaluation symbol 82 has been exposed and the answer selected, sheet marking means 110 is actuated to mark the columns 77 and 79 on sheet 20.

Marking means 110 includes a push button 112 having a manually engageable portion 114 that extends upwardly through a generally rectangularly shaped opening 116 in the upper frame member 14. Push button 112 further includes laterally outwardly extending guide portions 118 and 120 that also extend both forwardly and rearwardly (FIG. 2), respectively, from the lower end thereof, and guide portions 118 and 120 have generally planar upper surfaces 122 and 124 that are positioned in sliding, face abutting engagement with the planar undersurface portions 126 and 128 of the upper frame member 14. A leaf spring 130 is secured to the undersurface of frame member 14 by screws 132 (although the ends of the leaf spring could be press fit over pins), and the upwardly extending midportion of the leaf spring is seated within a downwardly facing groove 134 in the bottom of push button 112. Leaf spring 130 has an elongate clearance opening 136 in the center thereof, and a pinlike marking member 138 extends downwardly from the push button 112 through opening 136. Leaf spring 130 functions to yieldably bias the push button 112 upwardly, and the opening 136 in the leaf spring allows the push button to be moved longitudinally relative to the frame member 14.

Back up member 93 is positioned below opening 116, and an upwardly facing groove 94 in the back up member is positioned in alignment with the marking member 138. As can be best seen in FIG. 3, with the sheet 20 resting upon the back up member 93, when the push button 112 is pushed downwardly against the bias of spring 130, marking member 138 will move downwardly into groove 94 and make a dent or opening in the sheet 20. As is also evident from FIG. 3, the upwardly extending portion 114 of the push button 112 is closely confined within opening 116, so that it is positively guided during its rectilinear movement. Designators, such as lower case letters, corresponding to the designators on the multiple choice answers are provided on the upper surface of frame member 14 adjacent opening 116, as can be best seen in FIG. 1, and detent means is preferably provided for releasably retaining the push button 112 in a selected position of longitudinal adjustment for marking the appropriate area 83 of the sheet 20 after a question has been flashed and the multiple choice answer has been evaluated. In the illustrated embodiment, the detent means includes a plurality of longitudinally spaced recesses 140 in walls 117 of frame member 14, and a pair of aligned rib-like projections 142 on opposite sides of the laterally outwardly extending portions 118 and 120 of the push button 112 that are engageable with recesses 140.

After the viewing sheet 20 has been inserted into the device, and the push button 112 depressed so that the marking device 138 engages the sheet, a record of the answer that has been selected by the user will be provided on both the front and the back of the sheet. The procedure is repeated until all of the questions have been viewed and the multiple choice answers evaluated, and the "end" indicia moves into registration with aperture 26. The sheet 20 is indexed once again, and removed from the tachistoscope through slot 19.

As an alternative or supplementary sheet advancing means, a rubber roller 64 may be rotatably mounted in an aperture 28 adjacent the lower left hand end of the top member 14, with the roller 64 being positioned in sheet feeding relationship with a roller 66 carried by bottom member 16. Rollers 64 and 66 are arranged to provide a sufficient pressure between them that sheet 20 will be reliably advanced whenever roller 64 is rotated by the user. The pressure between the rollers also provides a braking effect that will hold sheet 20 in the position selected by the user of the tachistoscope until roller 64 is actuated again. The drag created by rollers 64 and 66 is not sufficient to impede the normal indexing movement of sheet 20 by the above mentioned indexing pin.

What is claimed is:

1. For use with a sheet having a plurality of questions to be recognized when momentarily exposed and a multiple choice answer for each question to be evaluated after a question has been viewed, said sheet also having a marking zone for each question with each zone having a plurality of rectilinearly spaced marking areas, each area corresponding to one answer of said multiple choice answers, a tachistoscope comprising: a frame; a manually operable shutter mechanism mounted on said frame, said frame having a slot for receiving said sheet and a viewing window for exposing the question when said shutter mechanism is actuated and for exposing the multiple choice answers after the questions have been exposed; and a manually operable marking device mounted on said frame for rectilinear movement, said marking device having a sheet marking member positionable to mark a selected area of each marking zone of said sheet immediately following viewing of a question and evaluation of the corresponding multiple choice answer.

2. A tachistoscope as set forth in claim 1 in which said rectilinear movement is horizontal and which includes means mounting said marking device for vertical movement, in addition to said horizontal rectilinear movement, and means biasing said marking device upwardly to a position for manual operation, said marking member being adapted to mark said sheet upon movement of said marking device downwardly against said biasing means.

3. A tachistoscope as set forth in claim 2 including back up means on said frame for supporting said sheet beneath said marking means.

4. A tachistoscope as set forth in claim 2 including means on said frame defining a plurality of selectable locations for said marking means, each location corresponding to one answer of said multiple choice answers, and detent means for releasably retaining said marking means in said selectable locations.

References Cited
UNITED STATES PATENTS

| | | | |
|---|---|---|---|
| 3,144,720 | 8/1964 | Kehl | 35—9 B |
| 3,358,391 | 12/1967 | Warren et al. | 35—35 B |
| 3,482,332 | 12/1969 | Hvale et al. | 35—35 B |
| 3,529,364 | 9/1970 | Warren | 35—35 B |

WILLIAM H. GRIEB, Primary Examiner

U.S. Cl. X.R.

35—35 B